United States Patent [19]
Bailey et al.

[11] Patent Number: 5,395,188
[45] Date of Patent: Mar. 7, 1995

[54] GUIDE FOR ANGLED AND CURVED DRILLING

[75] Inventors: Charles E. Bailey, Glendale, Ariz.; Roy E. Bowling, 1355 Harlan, Lakewood, Colo. 80214

[73] Assignee: Roy E. Bowling, Lakewood, Colo.

[21] Appl. No.: 172,500

[22] Filed: Dec. 23, 1993

[51] Int. Cl.⁶ .............................................. B23B 45/14
[52] U.S. Cl. .................... 408/127; 408/72 B; 408/83
[58] Field of Search ............ 408/72 B, 83, 97, 115 B, 408/115 R, 127, 241 B

[56] References Cited

U.S. PATENT DOCUMENTS

| | | | |
|---|---|---|---|
| 447,389 | 3/1891 | Wentworth | 408/127 |
| 550,783 | 12/1895 | Elliott et al. | 408/127 |
| 2,711,199 | 6/1955 | Salsberg | 408/127 |
| 2,747,384 | 5/1956 | Beam | 408/127 |
| 2,958,349 | 11/1960 | McNutt | 144/104 |
| 2,960,892 | 11/1960 | Spravka | 408/127 |
| 3,006,223 | 10/1961 | Broussard | 408/127 |
| 3,016,073 | 1/1962 | Broussard et al. | 408/127 |
| 3,365,987 | 1/1968 | Heller et al. | 408/127 |
| 3,617,143 | 11/1971 | McKee | 408/127 |
| 4,769,118 | 9/1988 | Johns | 204/129.55 |
| 5,017,057 | 5/1991 | Kryger | 408/68 |

FOREIGN PATENT DOCUMENTS 854712 8/1981 U.S.S.R. .............................. 408/56

*Primary Examiner*—Daniel W. Howell
*Attorney, Agent, or Firm*—Ralph F. Crandell

[57] ABSTRACT

A drilling tool for drilling a curved hole. The tool includes a curved guide tube for positioning the tube in drilling position against a wall and a flexible shaft extending through the guide tube having a drill bit on the end thereof adjacent the outlet end of the tube and a shank on the opposite end engaged in a drill tool chuck. Operation of the drill tool rotates the drill bit and the tube guides and directs the bit to drill a curved or angled hole. The drill bit can be a spade bit, a spiral bit or a ball mill.

14 Claims, 5 Drawing Sheets

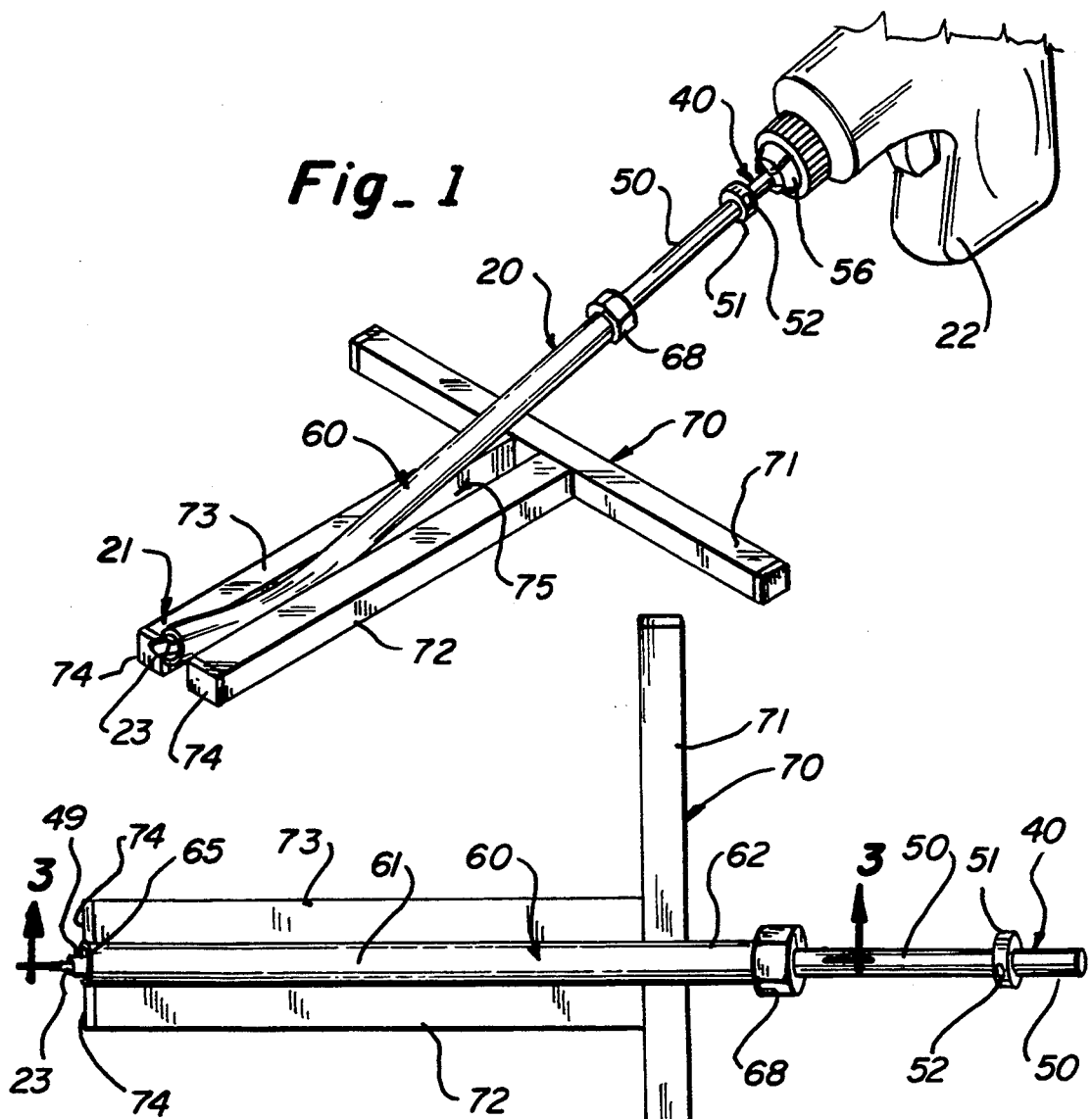
Fig_1
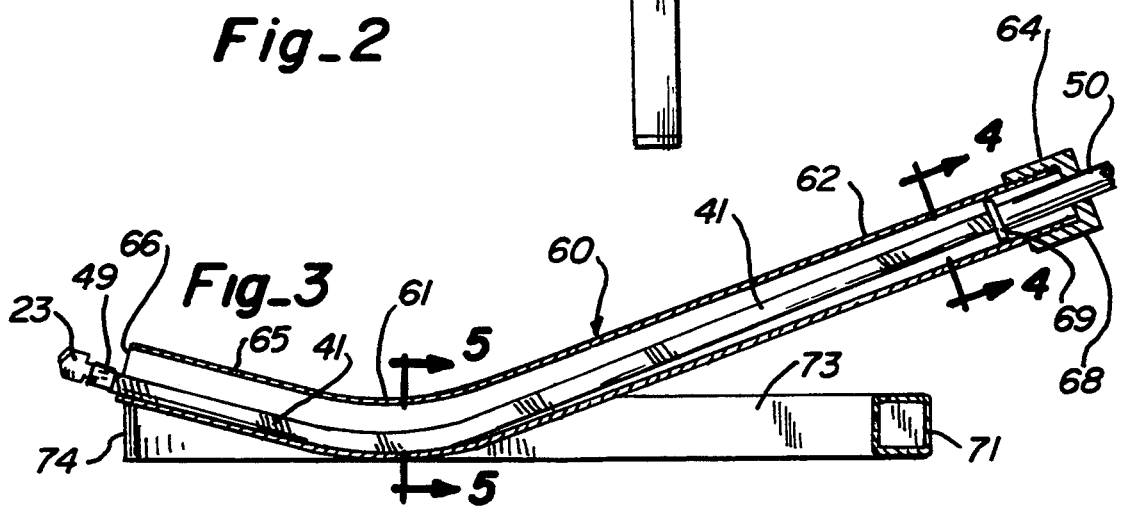
Fig_2
Fig_3

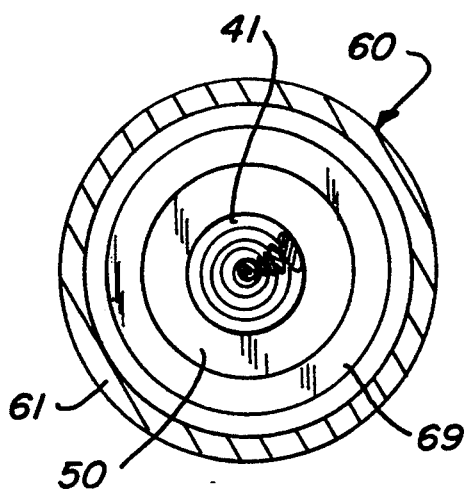
Fig_4
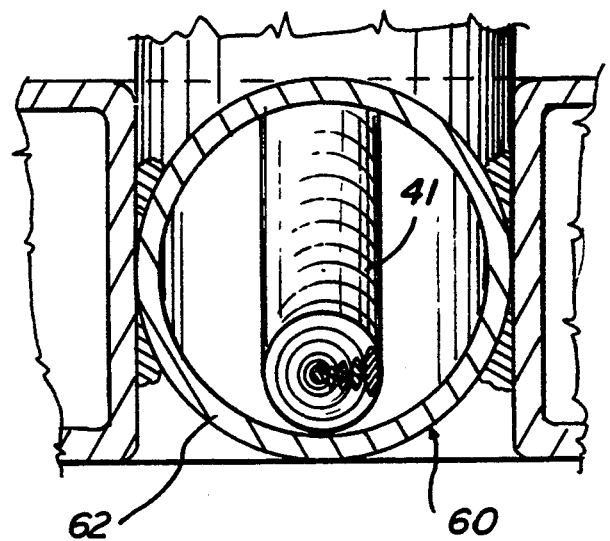
Fig_5
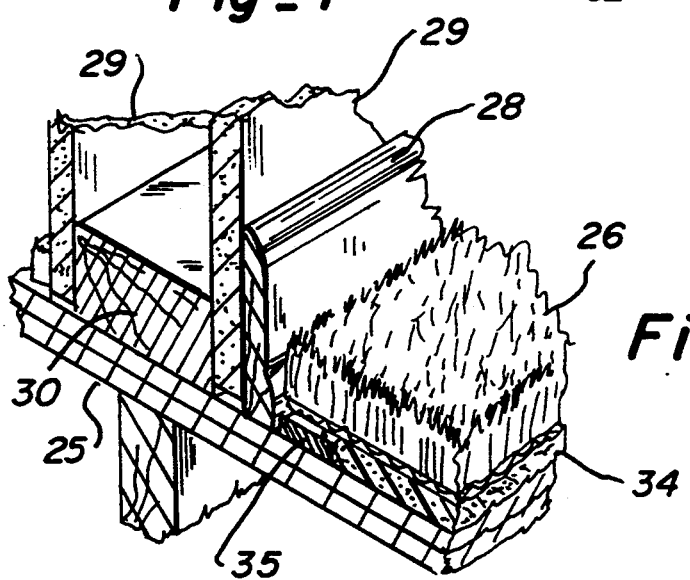
Fig_6
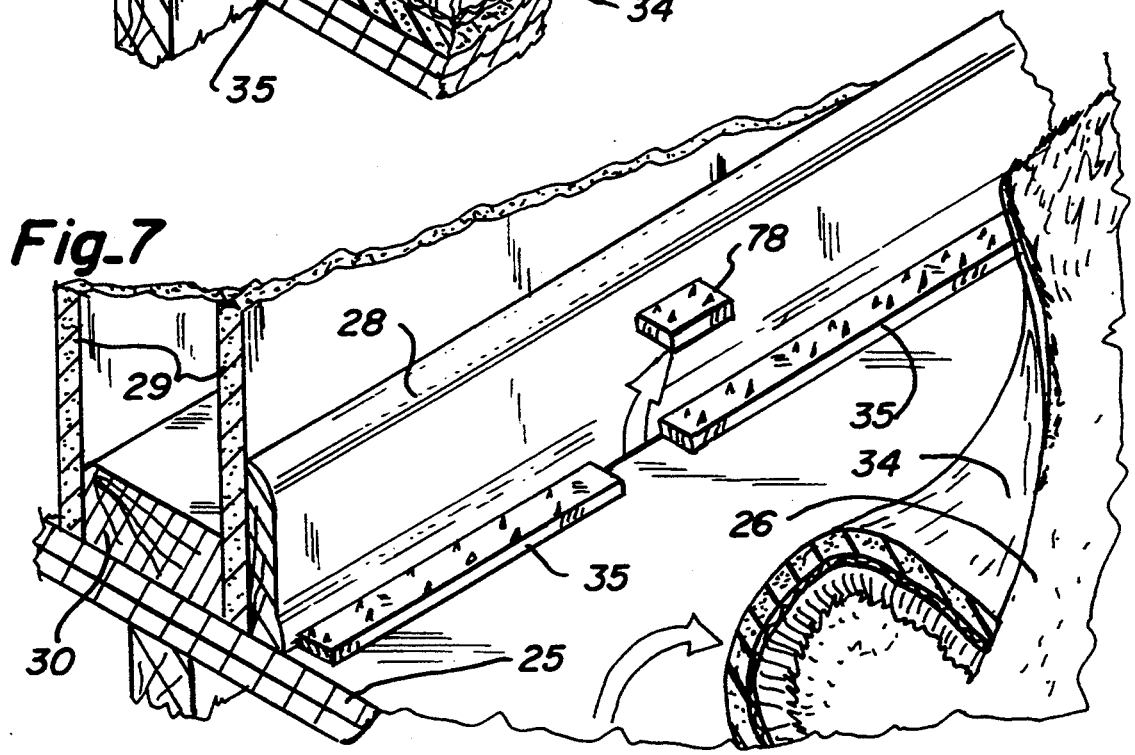
Fig_7

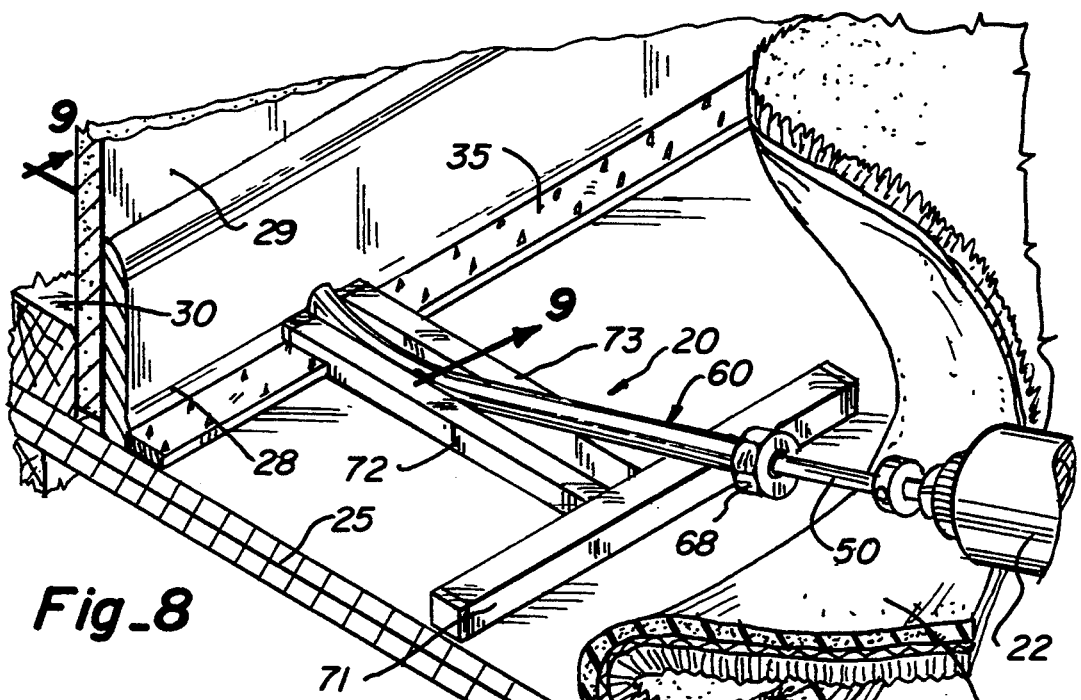
Fig_8
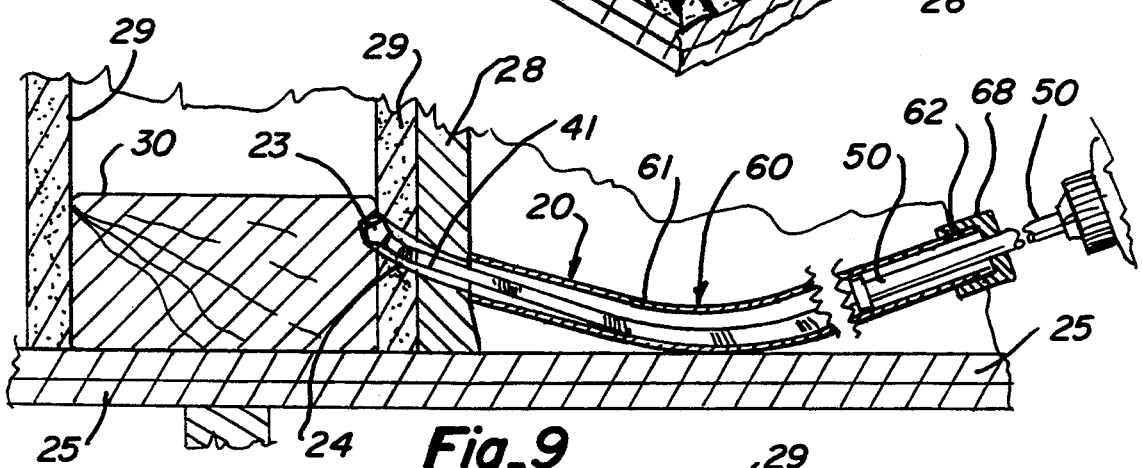
Fig_9
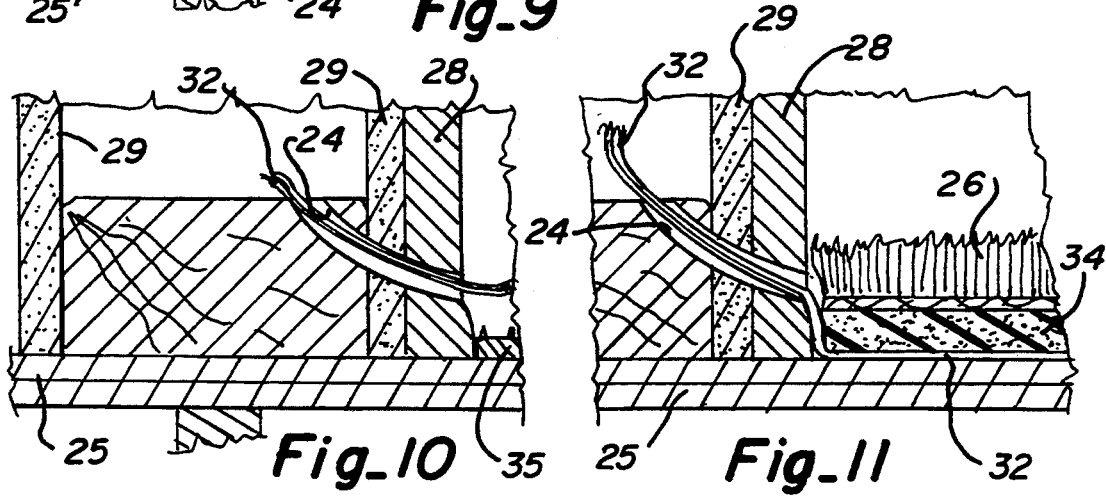
Fig_10   Fig_11

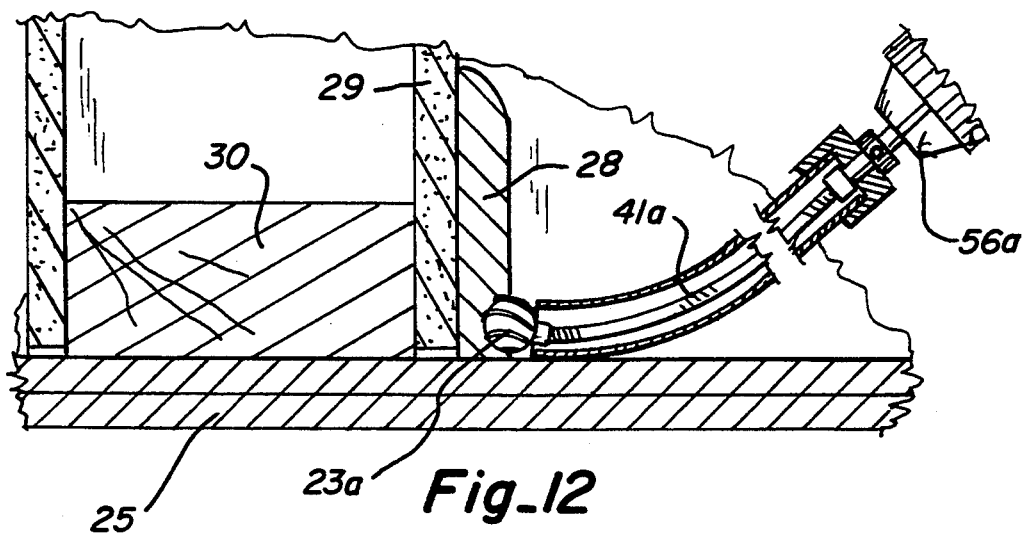
Fig_12
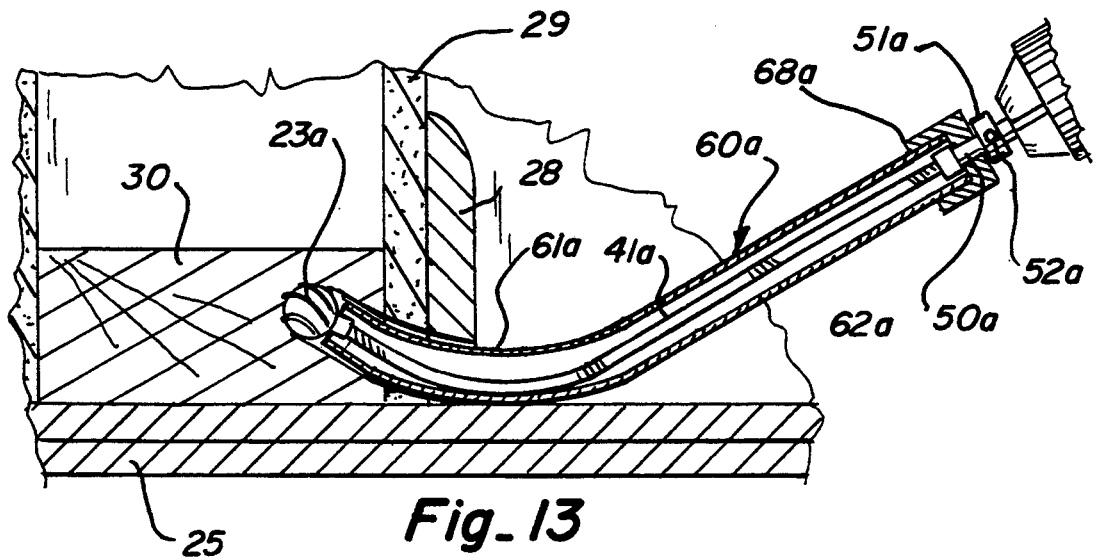
Fig_13
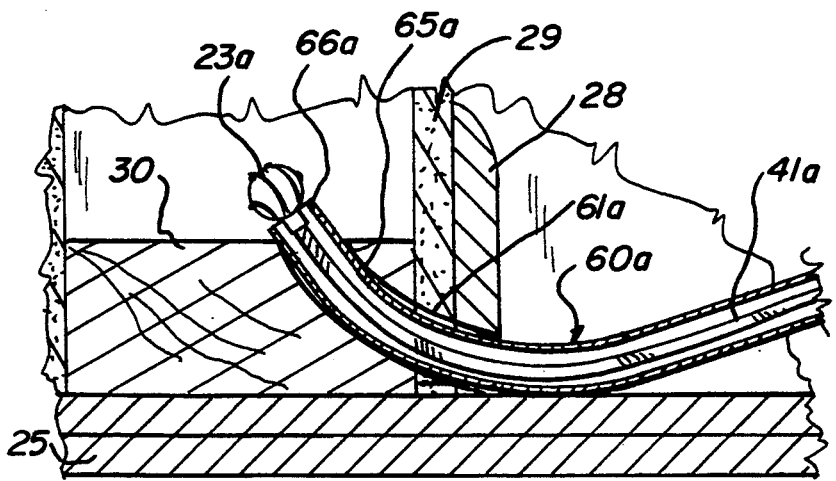
Fig_14

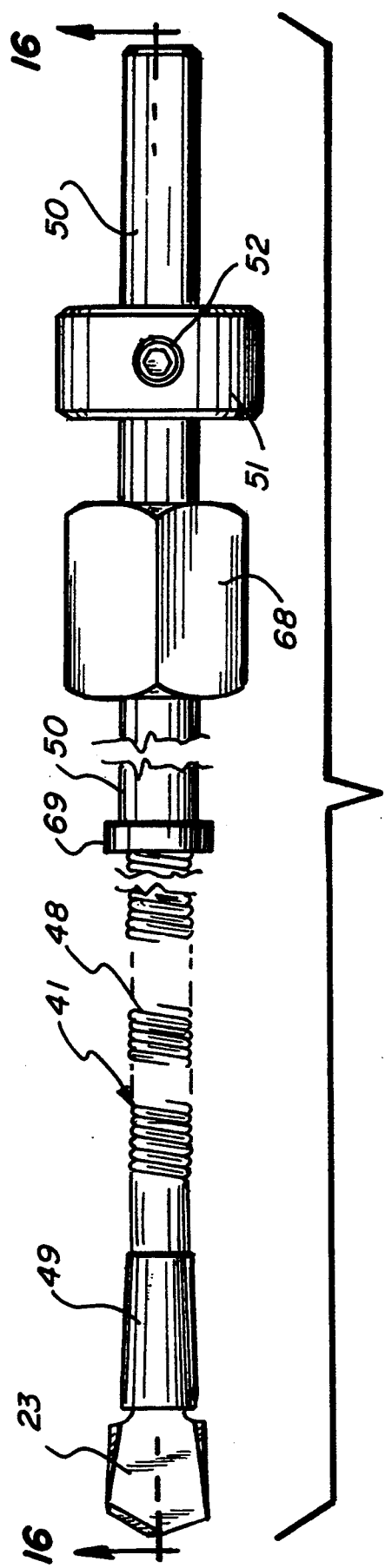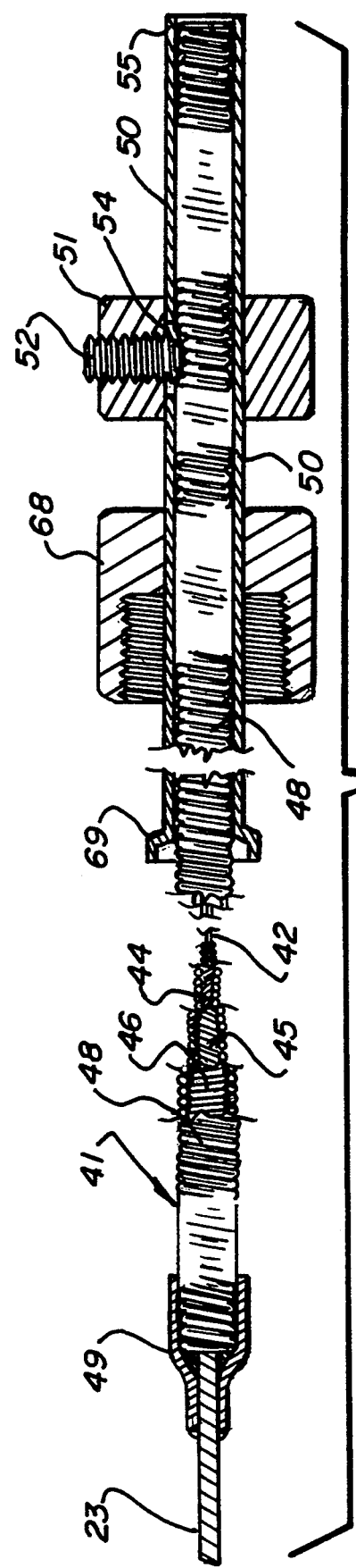

GUIDE FOR ANGLED AND CURVED DRILLING

BACKGROUND OF THE INVENTION

1. Field of the Invention

The present invention relates to drilling tools and more particularly to drilling tools for drilling curved or angled holes. More specifically, the present invention relates to a drill guide for an axially extending drilling tool for drilling curved holes at floor or carpet level through a baseboard and floor plate into the interior of a wall.

2. Description of the Prior Art

When installing wires in the interior of walls in existing buildings for purposes such as telephone wiring, audio and video system wiring, security system wiring and the like, it is often necessary to drill one or more holes at floor level through which wiring can be inserted and run through the interior of the wall structure. Many buildings also include a baseboard and floor carpeting utilizing tack strip, padding and carpet. The interior of such walls may include a wood floor plate, usually a two by four board or similar board resting on the floor. In order to drill a hole into the interior of the wall but close to the floor, it is necessary to drill at an upward angle through the floor plate. This is often difficult to do because of a lack of clearance for the tools utilized. Because it is difficult with the usual tools such as drills and drill bits to drill a hole sufficiently close to the floor that the hole may be hidden by carpet or flooring but with the hole extending into the wall and opening into the wall interior above the floor plate, holes are ordinarily drilled as close to floor level as possible but above the floor plate, and are then patched or spackled and repainted.

OBJECTS AND SUMMARY OF THE INVENTION

It is the principal object of the present invention to provide an improved drilling tool capable of drilling a curved or angled hole.

It is a more specific object of the present invention to provide a tool for guiding a drill bit into the interior of a wall space through the floor plate and baseboard.

Another object of the present invention is to provide a drilling tool which is capable of drilling a hole into a wall beginning at floor level below the carpet line to hide the hole without necessitating removal of the baseboard.

Another object of the present invention is to provide a tool of the foregoing character which is capable of drilling the hole beginning in a confined area, such as the junction between the floor and baseboard.

Still another object of the present invention is to provide an improved drill tool of the foregoing character which facilitates drilling holes through a wall at floor or baseboard level upwardly into the wall interior above the floor plate and between the studs.

A further object of the present invention is to provide an improved drilling tool of the foregoing character which is simple and easy to use with a power drill tool.

Still a further object of the present invention is to provide a drill tool of the foregoing character which is useful for drilling holes adjacent floor level into a wall for the installation of wiring such as telephone, stereo, audio or alarm wire.

Still a further object of the present invention is to provide an improved drill tool for facilitating the drilling of directional holes in locations which inhibit or hinder the use of a power drill tool.

Still another object of the present invention is to provide an improved drill tool for facilitating the drilling of holes through a baseboard into the interior of a wall and at a level which is covered and concealed by carpeting without removal of the baseboard.

In accordance with the foregoing objects, the present invention is embodied in a drill tool which includes a guide or drilling tool support and a drill bit for drilling angled or curved holes. One embodiment of the present invention is a tool which comprises a curved guide tube forming a drill guide support, having an upwardly directed inlet end and an upwardly directed outlet end joined by a curved central portion. The inlet leg of the tool is longer than the outlet leg for supporting a bearing journaling the drill shaft. The guide tube is supported in drilling position against a wall. In one modification, the support structure embodies a bifurcated shank and a crossbar. The tube is supported between the legs of the bifurcated shank.

A drill bit is formed with a flexible shaft which extends through the guide tube from the inlet and through the inlet leg to the outlet leg and outlet end. A walking drill cutting bit is mounted on the end of the shaft adjacent to the outlet end of the tube. A shank on the end of the shaft adjacent the inlet end of the tube provides for operative engagement of the drill with a drilling tool. Operation of the drilling tool rotates the drill bit while the guide tube directs the rotating drill bit at an upwardly inclined or curved direction from the supporting floor surface. When used with a wall for example, the drill bit enters the wall at the lower edge of the baseboard and walks or angles upwardly through the baseboard wall and floor plate into the space between the walls. The length of the flexible shaft is sufficient to enable the drill bit to penetrate the baseboard wall and floor plate into the interior space between the walls.

Once the hole is drilled, wires can then be fished from the hole utilizing an appropriate fish wire or strip. The wiring can then be pulled either through or back through the hole and run along the baseboard under adjoining carpet. The carpet and pad covers the hole in the baseboard. When tack strip is present, a section is cut from the tack strip adjacent the location where the hole is to be drilled. The cut section can then be replaced prior to repositioning the carpet and pad. When the carpet and padding is replaced, the hole is hidden. In this manner, removal and replacement of the baseboard is not necessary.

The drill bit embodies a flexible shaft adapted to extend through a curved guide tube. A shank is provided at one end for engagement in the chuck of a drill tool and at its other end the flexible shaft mounts drill bit such as a spade-type drill bit or a spiral bit. The flexible shaft includes a rigid shaft section journaled in a sleeve bushing in one end of the curved tube. A flat angled spade-type drill bit provides a directional drilling function depending on the pressure exerted on the tool. A ball mill type drill bit can be used to cut a curved hole or groove and thus provide a directional cutting effect.

DESCRIPTION OF THE DRAWINGS

FIG. 1 is a perspective view of a drill tool embodying the present invention together with a power drill.

FIG. 2 is a top plan view of the drill tool shown in FIG. 1.

FIG. 3 is a section view taken substantially in the plane of line 3—3 on FIG. 2.

FIG. 4 is a section view taken substantially in the plane of line 4—4 on FIG. 3.

FIG. 5 is a section view taken substantially in the plane of line 5—5 on FIG. 3.

FIG. 6 is a perspective view, partly in cross-section, of a floor and wall construction with a baseboard, carpet pad, and carpet.

FIG. 7 is a perspective view partly in section of a floor, wall, and carpet construction with the carpet pulled back from the wall to expose the carpet tack strip and baseboard.

FIG. 8 is a perspective view of a floor and wall construction showing the positioning of the drill guide and support structure embodying the present invention for drilling a hole through the baseboard and wall floor plate into the space between the walls.

FIG. 9 is a section view taken substantially in the plane of line 9—9 on FIG. 8.

FIG. 10 is a section view similar to FIG. 9 but showing a wire extending through a drilled hole.

FIG. 11 is a section view similar to FIG. 9 but showing a wire installation through the drilled hole.

FIG. 12 is an elevational section view showing a tool embodying the present invention but omitting the support structure, with the tool secured to the chuck of a drill tool and in position for drilling a hole through a baseboard wall and wall plate.

FIG. 13 is a view similar to FIG. 12 but showing the tool having drilled a hole partially through the wall plate.

FIG. 14 is a view similar to FIG. 13 but showing the tool having drilled a hole through the baseboard, wall and wall plate.

FIG. 15 is a plan view of a flexible shaft drill bit embodying the present invention.

FIG. 16 is a section view taken substantially in the plane of line 16—16 on FIG. 15.

DESCRIPTION OF THE INVENTION

The present invention is embodied in an improved drill tool 20 including a drill bit assembly 21 for use with a power drill 22, as shown in FIG. 1, and finds particular but not exclusive utility for drilling curved holes at carpet level through a baseboard, wall and floor plate into the interior of a wall as shown in FIGS. 7 through 9. Such holes are intended primarily for use in stringing wiring which extends along the floor and baseboard and into the interior of a wall, from which it may be directed to a desired outlet, as shown in FIGS. 10 and 11.

Conventional wall construction on a supporting floor 25 includes a floor plate 30, generally formed of two-by-four lumber, with wall panels 29, ordinarily drywall, on opposite sides of the floor plate 30 with spaced interior studs. Exterior baseboards 28 finish the wall construction. Carpet 26 with an underlying supporting pad 34 is laid on the floor 25 and held in place by lengths of tack strip 35 as shown in FIGS. 6 and 7.

To provide a curved path to drill a curved hole, the drill bit assembly 21 embodying the present invention utilizes a walking drill bit 23 such as a flat or spade bit, or alternatively a ball mill, a conventional spiral bit, or other form of bit. The bit assembly 21 further incorporates a shank 40 adapted to be mounted at one end in the chuck of a drill tool 22, and connected to one end of a flexible shaft 41. At its opposite end, the flexible shaft 41 mounts the cutting bit 23.

The flexible shaft 41 of the drill bit assembly 21 is a stiffly-flexible coiled wire cable, the coils of which are tightly wound to produce a strong flexible shaft. The flexible shaft 41, as shown in FIG. 16, is preferably a multiple-layer wire coil cable formed by a central wire strand 42 and four surrounding wire coils 44, 45, 46 and 48. The first or inner four-wire coil wrapping 44 wound in a clockwise direction on the central issue strand 44. Surrounding the first or innermost wire coil 44 is a second heavier four-wire strand coil 45 wrapped in a counterclockwise or left-handed direction. Surrounding the second coil 45 is a third, still heavier five-wire coil 46 composed of five wire strands wrapped in a clockwise direction, and in turn surrounded by an outer six-wire strand heaviest wire coil 48 wrapped in a counterclockwise direction. In order to insure that the coil does not unwind during use and because drilling tools normally rotate in a clockwise direction, the outer and heaviest coil 48 is wound in a counterclockwise or left-handed direction, looking at the coil from the tool driving or shank end. This prevents uncoiling of the flexible cable as a result of the torque imparted by the drill power unit. The wire coils are preferably formed of spring steel wire, and the cable 41 is capable of withstanding at least 70-foot pounds of torque.

To protect the cable ends, the cut ends of the cable are coated with a silver solder. Each cable end is coated with a silver solder coating having a 56% silver content and a melting point of between about 1275°–1350° F. (690° C.–735° C.).

The cutting bit 23 is secured to one end of the cable 41 by a sleeve connector 49 crimped and secured to the cutting bit 23 and receiving an inserted end of the cable 49.

For engagement with a power drill tool, the opposite end of the flexible cable 41 is inserted in a stainless steel sleeve 50 and secured thereto by a bushing or collar 51 with a set screw 52 which extends through an aperture 54 defined in the sleeve 50 into engagement with a solder-coated end of the cable 41. The solder coating on the cable end is preferably of a lower temperature solder, approximately a 5% silver solder which melts in the range of about 475° F. to 525° F. (245° C.–275° C.). The rigid shaft 50 extends through the collar 51 and defines a shank end 55 forming the shank 40 adapted to be received and gripped in the chuck 56 of the drill tool 22. Because the sleeve is stainless steel and provides a hard surface, it further acts as a clutch, slipping in the chuck, in the event the drill bit jams thereby preventing injury to the power drill tool 22.

For guiding the drill bit 21 to drill a hole in a desired direction, the drill tool 20 includes a curved guide sleeve or tube 60 having a central curved portion 61 extending at one end to define an inlet leg 62 extending upwardly at an angle of about 20° with respect to the horizontal, and terminating in an inlet end 64. At its other end, the curved guide tube extends to define an outlet leg 65 extending upwardly at an angle of about 15° with respect to the horizontal, and terminating in an outlet end 66. For supporting the drill bit 21 in the guide tube 60, a cap bushing 68 is threaded securely to the inlet end 64 of the guide tube 20. The bushing journals the drill shaft 50 for rotating and sliding movement through the curved tube thereby enabling the drill bit 21 to project outwardly through the outlet end 66 of the tube 20 into an adjacent surface through which a hole 24 is to be drilled. Alternatively, an internal bushing (not shown) may be inserted in the inlet leg 62 of the guide tube 20 for journalling the shaft 41. The bushing end 69 of the shaft 50 is expanded, upset or flared to prevent it from being withdrawn from the bushing 68 when the tool is in use, thereby preventing damage to the tool or injury to the user resulting from the drill bit being retracted too far into the guide tube.

A curved hole is provided by the configuration of the drill bit, the relationship of the flexible drill bit and guide tube, and the axial pressure placed on the drill bit during the drilling operation. For drilling a curved hole utilizing the directional aspects of the bit, the drill bit 21 is either a relatively blunt ended spade or flattened bit, with cutting edges angled at approximately 45° with respect to the axis of the bit, as shown in FIG. 3, or a spiral bit. While the spade bit is preferred, either bit will walk or travel in a curved path depending on the axial force thereon. With a spiral bit, a greater driving force is required to effect a curved or angled path.

The drill guide tube also has an effect on the curvature of the hole being drilled. As shown in FIGS. 3 and 5, the guide tube 60 has an internal diameter approximately two to three times the diameter of the flexible shaft 41. In other words the flexible shaft 41 is smaller in diameter than the tube. During drilling operation of the drill, the flexible shaft 41 bends and rides on the bottom of the curved tube 61 as shown in FIG. 3, and then is forcibly pushed or directed upwardly towards the top of the outlet end of the guide tube, as shown in FIG. 8, as an axial driving force is exerted on the bit. The greater the driving force, the more the bit will walk, or curve away from its true axial direction. The hole itself, as it is drilled, acts as an extension of the guide tube so that with sufficient driving force the bit will drill a hole in a generally circular path.

For supporting the drill guide tube 60 and positioning the same on the floor at floor level against a baseboard for the drilling operation, a T-shaped support 70 engages and supports the guide tube 60 at its curved portion 61. To this end, the T-shaped support 70 is formed by a crossbar 71 joining a pair of spaced legs 72 and 73 between which the guide tube 60 is secured. The legs 72 and 73 are each joined at one end to the crossbar 71 and with their opposite free ends 74 flush with the plane of the outlet end 66 of the guide tube. The spaced legs 72 and 73 define a channel 75 the width of the guide tube 60, and the legs are secured, as by welding or other appropriate means, to either side of the guide tube.

To utilize the tool, 20 for drilling a hole through a baseboard 28 adjacent a floor 25 covered with carpet 26, the carpet 26 is released from the tack strip 35, and the carpet 26 and pad 34 are folded back away from the wall 29 and baseboard 28. A section of tack strip 78 approximately the width of the tool 20 is cut from the mounted tack strip 35. The cut tack strip section 78 may be saved for reuse. The guide tool 20 is then positioned with the end of the legs 72, 73 and the outlet end 66 of the guide tube against the baseboard 28 as shown in FIG. 8.

When the guide tool is in place the drill tool secured to the end of the drill shank is operated to rotate the drill bit 21 which penetrates the baseboard 28, wall 29 and floor plate 30 and drills a hole 24 in a curve or at an angle into the interior of the wall. The drill bit is then retracted from the hole and into the guide tube 60 and the guide tool removed.

After the hole is drilled, a wire 32 can then be fished through the hole 24 into the interior of the wall and run to any desired location. The exterior end of the wire 32 may be placed on the floor, the tack strip section 78 inserted in place, and the carpet and pad relaid, as shown in FIG. 11. With the hole drilled through the baseboard at floor level, the carpet 26 hides the wire 32 and the hole opening 24, thereby avoiding the necessity of spackling or patching the wall or removal and replacement of the baseboard.

A modified drill tool embodiment of the invention is shown in FIGS. 12, 13 and 14. In describing this embodiment, referenced characters to elements corresponding to those described above will be utilized with the distinguishing suffice "a". The drilling tool embodiment shown in FIGS. 12–14 finds principal but not exclusive utility for drilling larger curved holes such as may be necessary for some cable television and audio installations, again in applications in which it is desired to have a hole drilled closely adjacent a floor or in another like-confined situation. This modification is capable of drilling larger holes such as holes ½ inch or ⅝ inch in diameter. Again, it is desirable to drill the hole at floor level through a baseboard and up into the interior of a wall so that the hole outlet may be covered by the floor padding and carpeting without necessitating removal of the baseboard or filling or spackling the hole.

For drilling the larger holes, a bit 23a in the form of a ball mill is utilized together with a stiffly flexible coiled wire cable or shaft 41a secured at one end to the ball mill 23a and at its other end to a sleeve shank 50a in the manner described above. The shank 50a is tubular and the flexible shaft 41a extends through the tube and is secured thereto by a collar 51a and set screw 52a. The extending end of the tubular shank 50a is adapted to be secured in the chuck 56a of a drill tool. The flexible shaft 41a is confined in a curved guide sleeve or tube 60a having a central curved portion 61a extending at one end to define an inlet leg 62a terminating in an inlet end 64a to which a cap bushing 68a is threaded. The cap bushing 68a journals the shank or tubular shaft 50a. At its opposite end, the guide tube 60a terminates in an outlet leg 65a terminating in an outlet end 66a.

In this embodiment, because of the relatively larger diameter of the ball mill 23a, the ball mill does not retract into the tube and the outlet end 66a of the tube 60a is of a diameter equal or slightly smaller than the ball mill 23a.

In the drilling operation, the ball mill effectively cuts a hole or groove-like channel and the curvature is provided by the curved drilling tool 60a. To drill a hole through a baseboard and wall, the drilling tool is positioned at the junction of the baseboard and floor with the ball mill directed into the baseboard and wall generally parallel to the floor. By tipping the guide tube 60a about the curved mid-section 61, the ball mill can be guided in any desired direction. Thus, as the ball mill approaches the floor plate 30, having cut through the baseboard 28 and wall 29, the ball mill can be tipped as shown in FIG. 13 to cut a groove upwardly through the floor plate. Because the diameter of the ball mill is greater than the diameter of the outlet end 65a of the guide tube 60a, the tube can follow the ball mill up through the hole or groove in the floor plate and the groove milled or cut into the interior of the wall as shown in FIG. 14. By manipulating the ball mill, the hole or groove 24 can be enlarged to accommodate any desired weight cable or wire.

While illustrative embodiments of the present invention has been shown in the drawings and described above in considerable detail, it should be understood that there is no intention to limit the invention to the specific form disclosed. On the contrary, the intention is to cover all modifications, alternative construction, equivalents and uses falling within the spirit and scope of the invention as expressed in the appended claims.

We claim:

1. A drilling tool comprising a curved guide tube, a flexible shaft extending through said tube, said flexible shaft comprising a plurality of tightly wound wire coils and a central wire strand, a drill bit secured to said flexible shaft at one end of said tube, a rigid shaft affixed on the other end of said flexible shaft, and a bearing secured to said tube journaling said rigid shaft, said rigid shaft having a shank portion for engagement with a drill chuck.

2. A drilling tool as defined in claim 1 wherein the outermost wire coil of said flexible shaft is wound in a counterclockwise direction.

3. A drilling tool as defined in claim 2 wherein said flexible shaft includes at least two wire coils and wherein the next outermost coil is wound in a clockwise direction.

4. A drilling tool as defined in claim 2 wherein said flexible shaft includes at least three wire coils and wherein the further next outermost coil is wound in a counterclockwise direction.

5. A drilling tool as defined in claim 1 wherein said drill bit is a walking type drill bit.

6. A drilling tool as defined in claim 5 wherein said drill bit is a spade type bit.

7. A drilling tool as defined in claim 6 wherein said bit has two cutting edges defining a point angle of about 90°.

8. A drilling tool as defined in claim 1 wherein said rigid shaft is tubular and said flexible shaft is inserted therein, further comprising a collar and set screw securing said flexible shaft in said tubular rigid shaft, said tubular rigid shaft defining a hole for receiving said set screw.

9. A drilling tool as defined in claim 1 further comprising a T-shaped support frame defining a shank leg and a cross bar normal to said shank leg, and said guide tube is secured to said shank leg in parallel relation therewith.

10. A drilling tool as defined in claim 9 wherein said shank leg is bifurcated to define parallel spaced legs, and said guide tube is secured between said legs.

11. A drill guide for use with a drill bit and drill tool for drilling a hole into a wall through a wall floor plate comprising a curved guide tube having an upwardly directed inlet end and an upwardly directed outlet end, a support for holding said tube in drilling position against a wall spaced adjacent to the wall floor plate, a flexible shaft extending through said tube and mounting said drill bit on the end thereof adjacent the outlet end of said tube and a shank on the end of said shaft adjacent the inlet end of said tube for operative engagement with said drill tool, said support having a bifurcated shank defining spaced legs and a crossbar secured to one end of said legs with said tube being supported between said legs and stabilized by said crossbar whereby the operation of said drill tool rotates said drill bit and said tube guides and directs said bit through the wall floor plate to drill a hole from the exterior of said wall to the interior of said wall.

12. A T-shaped drill guide for use with a drill bit and drill tool for drilling a hole into a wall through a wall floor plate comprising a curved guide tube having an upwardly directed inlet end and an upwardly directed outlet end, a support for holding said tube in drilling position against a wall spaced adjacent to the wall floor plate, a flexible shaft extending through said tube and mounting said drill bit on the end thereof adjacent the outlet end of said tube and a shank on the end of said shaft adjacent the inlet end of said tube for operative engagement with said drill tool, said support having a pair of closely spaced legs and a crossbar secured to said legs at one end thereof, said tube being supported between and affixed to said legs and stabilized by said crossbar, whereby the operation of said drill tool rotates said drill bit and said tube guides and directs said bit through the wall floor plate to drill a hole from the exterior of said wall to the interior of said wall.

13. A drilling tool as defined in claim 1 wherein said drill bit is a ball mill.

14. A drill guide for use with a ball mill for drilling a hole into a wall adjacent a floor and through a wall floor plate upwardly into the interior of the wall, comprising a curved guide tube having a curved central portion with an upwardly directed inlet end and an upwardly directed outlet end, a flexible shaft extending through said tube and mounting said ball mill on the end thereof adjacent the outlet end of said tube, and a shank on the end of said shaft adjacent the inlet end of said tube for operative engagement with said drill tool, said curved guide tube journaling said flexible shaft whereby said drill tool rotates said ball mill and said guide tube directs said ball mill in a curved drilling and milling operation.

* * * * *